US009790909B2

(12) United States Patent
Jang

(10) Patent No.: US 9,790,909 B2
(45) Date of Patent: Oct. 17, 2017

(54) APPARATUS AND METHOD FOR PRE-HEATING AN ENGINE OF MILD HYBRID VEHICLE

(71) Applicant: Hyundai Motor Company, Seoul (KR)

(72) Inventor: Hwa Yong Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/918,052

(22) Filed: Oct. 20, 2015

(65) Prior Publication Data

US 2016/0363107 A1    Dec. 15, 2016

(30) Foreign Application Priority Data

Jun. 15, 2015 (KR) .................. 10-2015-0084253

(51) Int. Cl.
| | |
|---|---|
| *F02N 11/06* | (2006.01) |
| *B60W 20/40* | (2016.01) |
| *F02P 19/02* | (2006.01) |
| *B60K 6/48* | (2007.10) |
| *B60W 10/02* | (2006.01) |

(Continued)

(52) U.S. Cl.
CPC .............. *F02N 11/06* (2013.01); *B60K 6/48* (2013.01); *B60W 10/02* (2013.01); *B60W 10/06* (2013.01); *B60W 10/08* (2013.01); *B60W 10/26* (2013.01); *B60W 20/40* (2013.01); *B60W 30/18072* (2013.01); *F02N 11/04* (2013.01); *F02N 11/0866* (2013.01); *F02P 19/022* (2013.01); *F02P 19/026* (2013.01); *B60W 2540/10* (2013.01); *B60W 2540/12* (2013.01); *F02N 2200/101* (2013.01)

(58) Field of Classification Search
CPC .. B60L 2240/10; F02N 11/06; F02N 11/0833; B60W 20/40; F02P 19/026; F02P 19/02; F02P 19/00
USPC .............................. 123/179.21, 179.6, 179.3
See application file for complete search history.

(56) References Cited

U.S. PATENT DOCUMENTS

| | | | | |
|---|---|---|---|---|
| 4,106,465 A | * | 8/1978 | Bernhardt | F02P 19/02 123/179.21 |
| 4,122,679 A | * | 10/1978 | Charron | F02B 29/00 123/552 |

(Continued)

FOREIGN PATENT DOCUMENTS

| | | |
|---|---|---|
| JP | 2004-324442 A | 11/2004 |
| JP | 2005-299470 A | 10/2005 |

(Continued)

*Primary Examiner* — J. Allen Shriver, II
*Assistant Examiner* — Brian Cassidy
(74) *Attorney, Agent, or Firm* — Mintz Levin Cohn Ferris Glovsky and Popeo, P.C.; Peter F. Corless

(57) ABSTRACT

An apparatus and a method for pre-heating an engine of a mild hybrid vehicle are provided, and the apparatus includes: a pre-heating plug pre-heating the engine; a pre-heating controller recognizing the mild hybrid vehicle based on vehicle driving information, determining whether the mild hybrid vehicle enters a coasting driving mode based on the vehicle driving information, and generating a duty control signal according to a coasting driving time when the mild hybrid vehicle is driven in the coasting driving mode; and a driver supplying electrical energy of the low-voltage battery to the pre-heating plug according to the generated duty control signal.

13 Claims, 5 Drawing Sheets

(51) Int. Cl.
*B60W 10/06* (2006.01)
*B60W 10/08* (2006.01)
*B60W 10/26* (2006.01)
*B60W 30/18* (2012.01)
*F02N 11/04* (2006.01)
*F02N 11/08* (2006.01)

(56) References Cited

U.S. PATENT DOCUMENTS

| | | | | |
|---|---|---|---|---|
| 4,478,181 A * | 10/1984 | Kikuchi | ............... | F02P 19/022 |
| | | | | 123/145 A |
| 4,821,690 A * | 4/1989 | Masaki | ............... | F02P 19/02 |
| | | | | 123/145 A |
| 4,939,347 A * | 7/1990 | Masaka | ............... | F02P 19/022 |
| | | | | 123/179.6 |
| 5,722,502 A * | 3/1998 | Kubo | ............... | B60K 6/442 |
| | | | | 180/65.23 |
| 6,148,258 A * | 11/2000 | Boisvert | ............... | F02P 19/022 |
| | | | | 123/145 A |
| 6,354,256 B1 * | 3/2002 | Ohanian | ............... | F02M 31/125 |
| | | | | 123/179.21 |
| 6,430,482 B1 * | 8/2002 | Wakashiro | ............... | B60K 6/485 |
| | | | | 180/65.26 |
| 6,641,501 B2 * | 11/2003 | Kitajima | ............... | B60K 6/485 |
| | | | | 477/3 |
| 6,647,937 B2 * | 11/2003 | Nishimoto | ............... | F02D 41/1446 |
| | | | | 123/145 A |
| 6,671,591 B2 * | 12/2003 | Wolf | ............... | H02P 3/12 |
| | | | | 123/179.19 |
| 6,939,265 B2 * | 9/2005 | Rustige | ............... | B60W 10/02 |
| | | | | 477/175 |
| 6,988,572 B2 * | 1/2006 | Tatar | ............... | B60K 6/387 |
| | | | | 180/65.26 |
| 7,290,517 B2 * | 11/2007 | Marchand | ............... | F02B 63/04 |
| | | | | 123/179.19 |
| 7,290,627 B1 * | 11/2007 | Gardner | ............... | B60K 6/442 |
| | | | | 180/65.1 |
| 7,464,699 B2 * | 12/2008 | Joppig | ............... | F02D 9/10 |
| | | | | 123/179.21 |
| 7,769,505 B2 * | 8/2010 | Rask | ............... | B60K 6/24 |
| | | | | 180/65.275 |
| 8,115,144 B2 * | 2/2012 | Cassani | ............... | F02P 19/022 |
| | | | | 123/145 A |
| 8,140,205 B2 * | 3/2012 | Hanyu | ............... | B60K 6/48 |
| | | | | 322/28 |
| 8,166,946 B2 * | 5/2012 | Sekiguchi | ............... | F02P 19/02 |
| | | | | 123/179.3 |
| 8,261,864 B2 * | 9/2012 | Bhattarai | ............... | B60W 10/06 |
| | | | | 180/65.285 |
| 8,281,772 B2 * | 10/2012 | Kurtz | ............... | B60W 10/06 |
| | | | | 123/145 A |
| 8,639,430 B2 * | 1/2014 | Yu | ............... | B60K 6/48 |
| | | | | 123/3 |
| 8,818,603 B2 * | 8/2014 | Kinoshita | ............... | B60L 15/2045 |
| | | | | 180/65.275 |
| 8,847,118 B2 * | 9/2014 | Sakurai | ............... | F02P 19/025 |
| | | | | 219/262 |
| 8,884,451 B2 * | 11/2014 | Hatanaka | ............... | B60W 10/08 |
| | | | | 290/40 C |
| 8,909,425 B2 * | 12/2014 | Skelton | ............... | G05D 7/0676 |
| | | | | 180/65.31 |
| 8,958,970 B2 * | 2/2015 | Matsunaga | ............... | B60K 6/485 |
| | | | | 104/121 |
| 9,074,575 B2 * | 7/2015 | Sakurai | ............... | F02D 41/2432 |
| 9,175,661 B2 * | 11/2015 | Kurtz | ............... | F02D 41/06 |
| 9,239,017 B2 * | 1/2016 | McDonald | ............... | F02D 41/042 |
| 9,347,388 B2 * | 5/2016 | Bohn | ............... | F02N 11/0814 |
| 2002/0005178 A1 * | 1/2002 | Iwatani | ............... | F01M 5/021 |
| | | | | 123/41.14 |
| 2008/0163840 A1 * | 7/2008 | Toedter | ............... | F02P 19/026 |
| | | | | 123/145 A |
| 2010/0256848 A1 * | 10/2010 | Sasaki | ............... | B60K 6/46 |
| | | | | 701/22 |
| 2011/0253074 A1 * | 10/2011 | Talwar | ............... | F02D 41/401 |
| | | | | 123/41.1 |
| 2013/0152894 A1 * | 6/2013 | To | ............... | F02P 19/02 |
| | | | | 123/179.21 |
| 2013/0270352 A1 * | 10/2013 | Roth | ............... | B60H 1/00314 |
| | | | | 237/12.3 B |
| 2014/0102396 A1 * | 4/2014 | Nakamura | ............... | F02P 19/02 |
| | | | | 123/179.21 |
| 2015/0059680 A1 * | 3/2015 | Yoshida | ............... | F02P 5/1502 |
| | | | | 123/179.21 |
| 2015/0096518 A1 * | 4/2015 | Creviston | ............... | F02N 11/04 |
| | | | | 123/179.4 |
| 2015/0329119 A1 * | 11/2015 | Sujan | ............... | B60W 30/18072 |
| | | | | 701/54 |
| 2015/0330354 A1 * | 11/2015 | Choi | ............... | F02P 19/02 |
| | | | | 123/558 |
| 2015/0330503 A1 * | 11/2015 | Sujan | ............... | F16H 61/0213 |
| | | | | 701/55 |
| 2016/0115931 A1 * | 4/2016 | Ishikawa | ............... | F02N 11/0844 |
| | | | | 123/179.4 |

FOREIGN PATENT DOCUMENTS

| | | |
|---|---|---|
| JP | 2012-091696 A | 5/2012 |
| JP | 5176421 B2 | 4/2013 |
| JP | 2013-103557 A | 5/2013 |
| KR | 10-1393800 B1 | 5/2014 |

* cited by examiner

FIG. 3

| Coasting driving time | Duty ratio |
|---|---|
| T3 ≤ Tc | d % |
| T2 ≤ Tc < T3 | c % |
| T1 ≤ Tc < T2 | b % |
| Tc < T1 | a % |

APPARATUS AND METHOD FOR PRE-HEATING AN ENGINE OF MILD HYBRID VEHICLE

CROSS-REFERENCE TO RELATED APPLICATION

This application claims priority to and the benefit of Korean Patent Application No. 10-2015-0084253 filed in the Korean Intellectual Property Office on Jun. 15, 2015, the entire contents of which are incorporated herein by reference.

BACKGROUND OF THE DISCLOSURE (a) Technical Field

The present disclosure relates generally to an apparatus and a method for pre-heating an engine of a mild hybrid vehicle, and more particularly, to an apparatus and a method for pre-heating an engine of a mild hybrid vehicle, which control a pre-heating period differently according to a coasting driving period.

(b) Description of the Related Art

In general, various types of engines exist including a gasoline engine and a diesel engine. The gasoline engine is an internal combustion engine using gasoline as a fuel, sucks air and gasoline into a cylinder, and then ignites and combusts the compressed mixed gas. The diesel engine is an internal combustion engine using diesel as a fuel, sucks air into the cylinder, compresses the sucked air at a high pressure with a piston, injects the fuel at a high temperature and a high pressure, and then combusts the injected fuel by autoignition.

Since the diesel engine has higher thermal efficiency than the gasoline engine, fuel consumption is low, and as a result, the diesel engine is more economical. Therefore, in some instances, the diesel engine has been applied to a hybrid vehicle instead of the gasoline engine. A pre-heating plug (i.e., glow plug) that increases combustion performance by pre-heating air in an engine combustion chamber while cold starting can be mounted on the diesel engine.

In a typical diesel engine vehicle, since the engine does not stop while driving after starting, the pre-heating plug is used only during initial starting. Further, even in the case of the diesel engine vehicle to which idle stop and go (ISG) is applied, since the engine idle-stops only when the temperature of the engine is equal to or higher than a predetermined temperature, the pre-heating plug is used only during the initial starting.

On the contrary, in a hybrid vehicle with the diesel engine, the engine is frequently turned on/off together with driving of a motor. Accordingly, the pre-heating plug needs to be used whenever the temperature of the combustion chamber is low while starting the engine.

Meanwhile, a hybrid vehicle uses the engine and the motor as a power source. Hybrid vehicles include a hard type and a mild type. The hard type is a type that separately includes a drive motor for driving the vehicle and a generator producing power for actuating the drive motor; the mild type is a type configured in such a manner that one motor serves as both the drive motor and the generator.

FIG. 1 is a diagram illustrated for describing coasting driving of a mild hybrid vehicle. As shown in FIG. 1, the mild hybrid vehicle generally enters a coasting driving mode in which the mild hybrid vehicle is driven by inertia of the vehicle for fuel saving when a driver does not step on deceleration and acceleration pedals. For example, the vehicle enters the coasting driving mode during intervals A, B, and C when a vehicle velocity decreases. During the coasting driving mode, a clutch connecting the engine and the drive motor is controlled in a release state and the engine is switched to an off state. Further, the vehicle enters a fuel cut state in which fuel injection into the engine is cut.

Accordingly, as the temperature of a combustion chamber of the engine is lowered during the coasting driving mode, and the coasting driving mode ends, when the engine is switched to an on state again, combustion stability of the engine deteriorates. Therefore, in a mild hybrid vehicle, the engine is pre-heated through the pre-heating plug whenever the coasting driving mode ends. However, even when the coasting driving interval (A) is relatively shorter than driving intervals (B) and (C), pre-heating periods are the same as each other, and as a result, the temperature in the combustion chamber is higher than a target temperature and battery voltage for heating the pre-heating plug is unnecessarily consumed.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present disclosure has been made in an effort to provide an apparatus and a method for pre-heating a mild hybrid vehicle, which control a pre-heating period differently according to a coasting driving period.

Embodiments of the present disclosure provides an apparatus for pre-heating an engine of a mild hybrid vehicle which includes an engine, a motor-generator operating as a start motor, and a generator for starting the engine, a high-voltage battery, a low-voltage battery, and a clutch deployed between the engine and the motor-generator, the apparatus including: a pre-heating plug pre-heating the engine; a pre-heating controller recognizing the mild hybrid vehicle based on vehicle driving information, determining whether the mild hybrid vehicle enters a coasting driving mode based on the vehicle driving information, and generating a duty control signal according to a coasting driving time when the mild hybrid vehicle is driven in the coasting driving mode; and a driver supplying electrical energy of the low-voltage battery to the pre-heating plug according to the generated duty control signal.

The vehicle driving information may include battery information representing whether the high-voltage battery is mounted, motor information representing a specification of the motor-generator, actuation information of acceleration and deceleration pedals of the mild hybrid vehicle, association and dissociation state information of the clutch, and starting state information of the engine.

The mild hybrid vehicle may include a DC/DC converter controlled by a converter controller, converting electrical energy of the high-voltage battery, and supplying the converted electrical energy to the low-voltage battery, and the pre-heating controller may receive the battery information from the converter controller through a network, receive the motor information from the motor-generator through the network, and recognize the mild hybrid vehicle based on the battery information and the motor information.

The pre-heating controller may determine that the mild hybrid vehicle enters the coasting driving mode when the acceleration and deceleration pedals are not operated, the clutch is in a dissociated state, and the engine is off.

The pre-heating controller may control a look-up table storing pre-heating time information for each coasting driving time.

The pre-heating controller may extract the pre-heating time information corresponding to the coasting driving time from the look-up table, and generate the pre-heating time information as the duty control signal.

The driver may include a pulse control unit generating a pulse width modulation signal according to the duty control signal and a switching unit turned on/off according to the pulse width modulation signal to transfer the electrical energy of the low-voltage battery to the pre-heating plug.

The pulse control unit may generate the pulse width modulation signal at a duty ratio corresponding to the pre-heating time information.

Furthermore, according to embodiments of the present disclosure, a method for pre-heating an engine of a mild hybrid vehicle which includes an engine, a motor-generator operating as a start motor, and a generator for starting the engine, a high-voltage battery, a low-voltage battery, and a clutch deployed between the engine and the motor-generator, the method including: collecting vehicle driving information; recognizing the mild hybrid vehicle based on the vehicle driving information; determining whether the mild hybrid vehicle enters a coasting driving mode based on the vehicle driving information; detecting a coasting driving time when the mild hybrid vehicle enters the coasting driving mode; generating a duty control signal for controlling a pre-heating time according to the coasting driving time; and supplying electrical energy of the low-voltage battery to a pre-heating plug according to the generated duty control signal.

The vehicle driving information may include collecting battery information representing whether the high-voltage battery is mounted, motor information representing a specification of the motor-generator, actuation information of acceleration and deceleration pedals of the mild hybrid vehicle, association and dissociation state information of the clutch, and starting state information of the engine.

The determining of whether the mild hybrid vehicle enters the coasting driving mode may include determining that the mild hybrid vehicle enters the coasting driving mode when the acceleration and deceleration pedals are not operated, the clutch is in a dissociated state, and the engine is off.

The detecting of the coasting driving time may include detecting a start time of the coasting driving mode when the clutch is dissociated and the engine is turned off as, and detecting an end time of the coasting driving mode when the clutch is associated and the engine is turned on.

The supplying of the electrical energy of the low-voltage battery to the pre-heating plug may include generating a pulse width modulation signal at a duty ratio corresponding to the pre-heating time according to the duty control signal, and transferring the electrical energy of the low-voltage battery to the pre-heating plug through a switching element which is turned on/off according to the pulse width modulation signal.

Accordingly, in view of the embodiments disclosed herein, a heating period can be controlled differently according to a coasting driving period to stably pre-heat an engine without unnecessary consumption of a battery.

BRIEF DESCRIPTION OF THE DRAWINGS

FIG. 3 is a diagram illustrating a look-up table according to embodiments of the present disclosure.

DETAILED DESCRIPTION OF THE EMBODIMENTS

Figure 1:
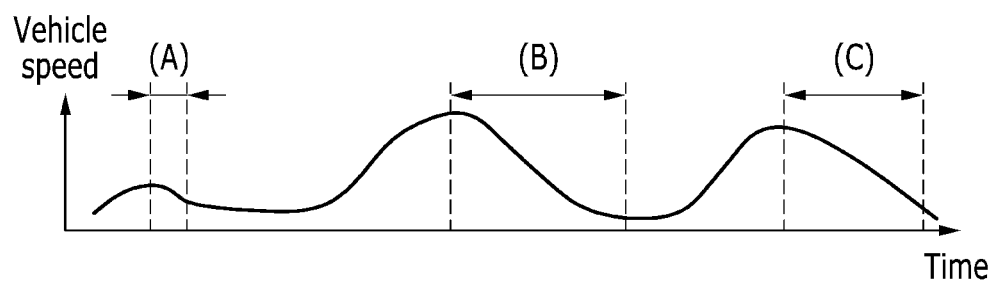
FIG. 1 is a diagram illustrated for describing coast driving of a mild hybrid vehicle.

In the following detailed description, only certain embodiments of the present disclosure are shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Throughout the specification, like reference numerals refer to like reference elements.

The terminology used herein is for the purpose of describing particular embodiments only and is not intended to be limiting of the disclosure. For instance, throughout this specification and the claims that follow, when it is described that an element is "coupled" to another element, the element may be "directly coupled" to the other element or "electrically coupled" to the other element through a third element. Addition, unless explicitly described to the contrary, the word "comprise" and variations such as "comprises" or "comprising" will be understood to imply the inclusion of stated elements but not the exclusion of any other elements.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, embodiments of the present disclosure will be described so as to be easily implemented by those skilled in the art, with reference to the accompanying drawings.

Figure 2:
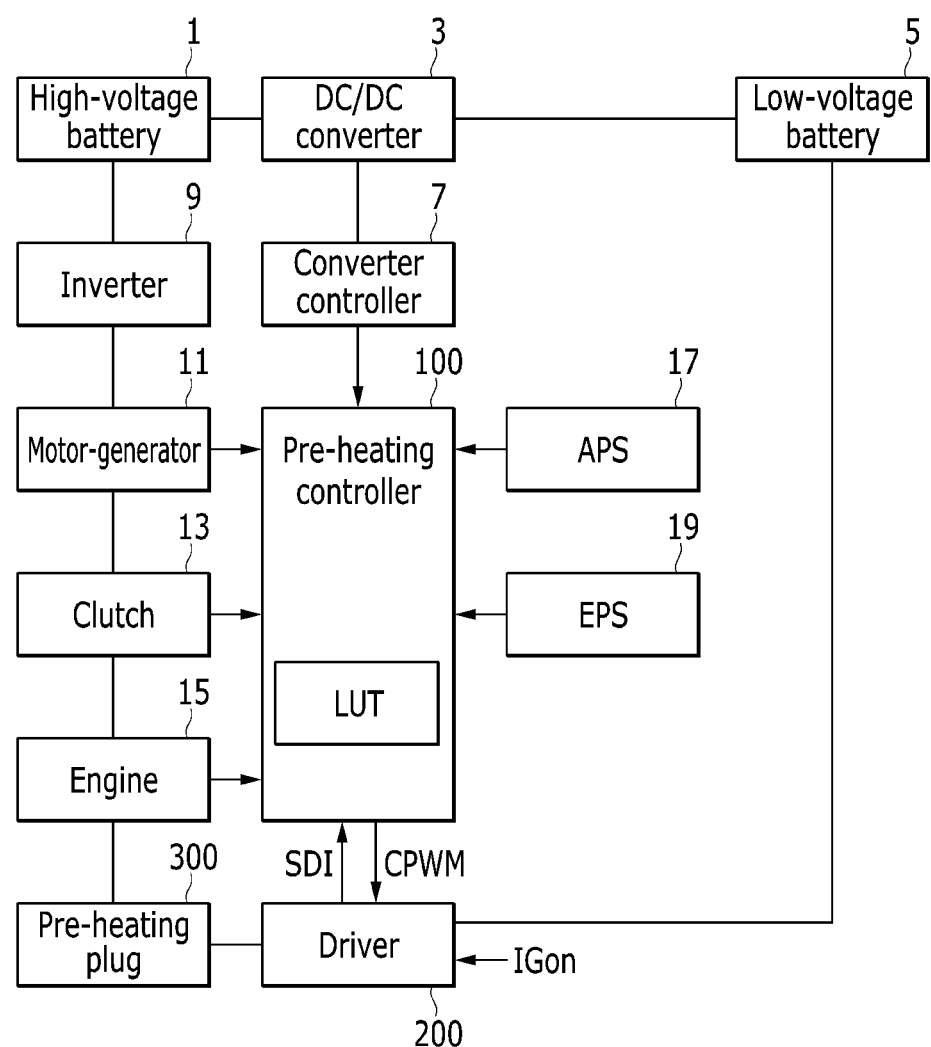
FIG. 2 is a diagram illustrating a mild hybrid vehicle according to embodiments of the present disclosure.
Figure 4:
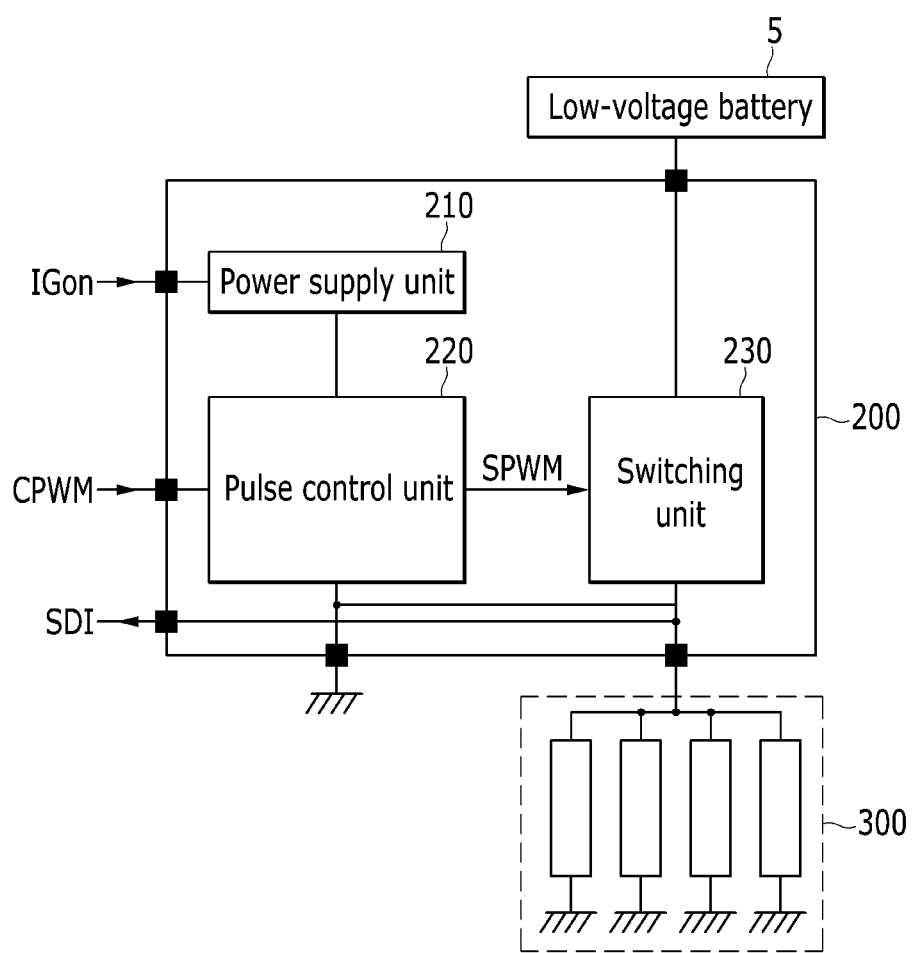
FIG. 4 is a detailed block diagram of a driver 200 illustrated in FIG. 2.

FIG. 2 is a diagram illustrating a mild hybrid vehicle according to embodiments of the present disclosure, FIG. 3 is a diagram illustrating a look-up table according to embodiments of the present disclosure, and FIG. 4 is a detailed block diagram of a driver 200 illustrated in FIG. 2.

As shown in FIG. 2, the mild hybrid vehicle according to embodiments of the present disclosure includes a high-voltage battery 1, a DC/DC converter 3, a low-voltage battery 5, a converter controller 7, an inverter 9, a motor-generator 11, a clutch 13, an engine 15, an accelerator position sensor (APS) 17, a brake position sensor (BPS) 19, a pre-heating controller 100, a driver 200, and a pre-heating plug 300.

The high-voltage battery 1 supplies electrical energy to the motor-generator 11 through the inverter 9, and is charged with electrical energy generated by the motor-generator 11. High voltage of approximately 42 V is stored in the high-voltage battery 1, and the high-voltage battery 1 is a battery which is not mounted on a general diesel vehicle. The DC/DC converter 3 converts a voltage level of the high-voltage battery 1 to supply the converted voltage level to the low-voltage battery 5. The low-voltage battery 5 supplies the electrical energy to the pre-heating plug 300 through the driver 200. Electrical energy of approximately 24 V is stored in the low-voltage battery 5.

The converter controller 7 controls the DC/DC converter 3 and communicates with the pre-heating controller 100 through a network at the time of receiving a battery information request from the pre-heating controller 100 to transmit whether the high-voltage battery 1 is mounted as the battery information. Herein, the network includes a controller area network (CAN), a local interconnect network (LIN), and the like.

The inverter 9 converts the electrical energy of the high-voltage battery 1 and supplies the converted electrical energy to the motor-generator 11, and converts the electrical energy generated by the motor-generator 11 and supplies the converted electrical energy to the high-voltage battery 1.

The motor-generator 11 operates as a start motor and a generator. The motor-generator 11 receives the electrical energy from the high-voltage battery 1 through the inverter 9 when operating as the start motor to turn on starting of an engine 15 and is generated by regenerative braking of a vehicle to charge the high-voltage battery 1. The motor-generator 11 communicates with the pre-heating controller 100 through the network at the time of receiving a motor information request from the pre-heating controller 100 to transmit a motor specification as motor information. Herein, the motor specification is pre-stored information for determining whether the motor is a motor mounted on the mild type of hybrid vehicle.

The clutch 13 is deployed between the motor-generator 11 and the engine 15 to associate and disassociate the motor-generator 11 and the engine 15 according to a driving mode. The engine 15 as a diesel engine using diesel as a fuel is pre-heated through the pre-heating plug 300 while starting.

The APS 17 senses the position of an acceleration pedal, and the BPS 19 senses whether a deceleration pedal is actuated and step force of the deceleration pedal. In the present disclosure, a case in which whether the deceleration pedal is actuated is sensed through the BPS 19 is described as an example, but the present disclosure is not limited thereto, and whether the deceleration pedal is actuated may be sensed through a brake lamp switch which is turned on/off at the time of operating the deceleration pedal.

The pre-heating controller 100 recognizes the mild hybrid vehicle and a coasting driving mode by using vehicle driving information, and generates a duty control signal (CPWM) according to a coasting driving time. Herein, the vehicle driving information includes the battery information, the motor information, information on actuation of the acceleration and deceleration pedals, association/dissociation state information of the clutch 13, and start on/off state information of the engine 15.

To this end, the pre-heating controller 100 requests the battery information from the converter controller 7 and requests the motor information from the motor-generator 11. The pre-heating controller 100 detects the mild hybrid vehicle or not according to the battery information and the motor information. For example, when the high-voltage battery 1 is mounted on the vehicle and the motor-generator 11 is mounted on the mild hybrid vehicle, the pre-heating controller 100 recognizes a current vehicle as the mild hybrid vehicle.

In addition, the pre-heating controller 100 detects whether the acceleration and deceleration pedals are actuated through the APS 17 and the BPS 19, and detects an association/dissociation state of the clutch 13 and the start on/off state of the engine 15 to detect coasting driving or not. When the acceleration and deceleration pedals are not operated, the clutch 13 is in a dissociated state, and the start of the engine 15 is off, the pre-heating controller 100 determines that the mild hybrid vehicle enters the coasting driving mode.

The pre-heating controller 100 controls a look-up table (LUT) for storing pre-heating time information for each coasting driving time, and extracts the pre-heating time information corresponding to the coasting driving time from the look-up table (LUT) to generate the duty control signal (CPWM). Herein, in the look-up table (LUT), duty ratios (pre-heating time) of a, b, c, and d % are set according to the coasting driving time within a duty ratio interval when the pre-heating plug 300 may be heated as illustrated in FIG. 3 (herein, a<b<c<d). Meanwhile, the pre-heating controller 100 receives a diagnosis signal (SDI) from the driver 200 to determine whether the pre-heating plug 300 malfunctions.

The driver 200 is activated according to an ignition on signal (IGon) and the electrical energy of the low-voltage battery 5 is supplied to the pre-heating plug 300 according to the duty control signal (CPWM). In detail, the driver 200 includes a power supply unit 210, a pulse control unit 220, and a switching unit 230 as illustrated in FIG. 4. The power supply unit 210 receives the ignition on signal (IGon) to convert the electrical energy of the low-voltage battery 5 into a voltage level required for operating the pulse control unit 220 and supply the electrical energy.

The pulse control unit 220 generates a pulse width modulation signal (SPWM) according to the duty control signal (CPWM) and transfers the generated pulse width modulation signal (SPWM) to the switching unit 230. The switching unit 230 supplies the electrical energy of the low-voltage battery 5 to the pre-heating plug 300 according to the pulse width modulation signal (SPWM). Herein, the switching unit 230 includes a power switching element, for example, a field effect transistor (FET).

Figure 5:
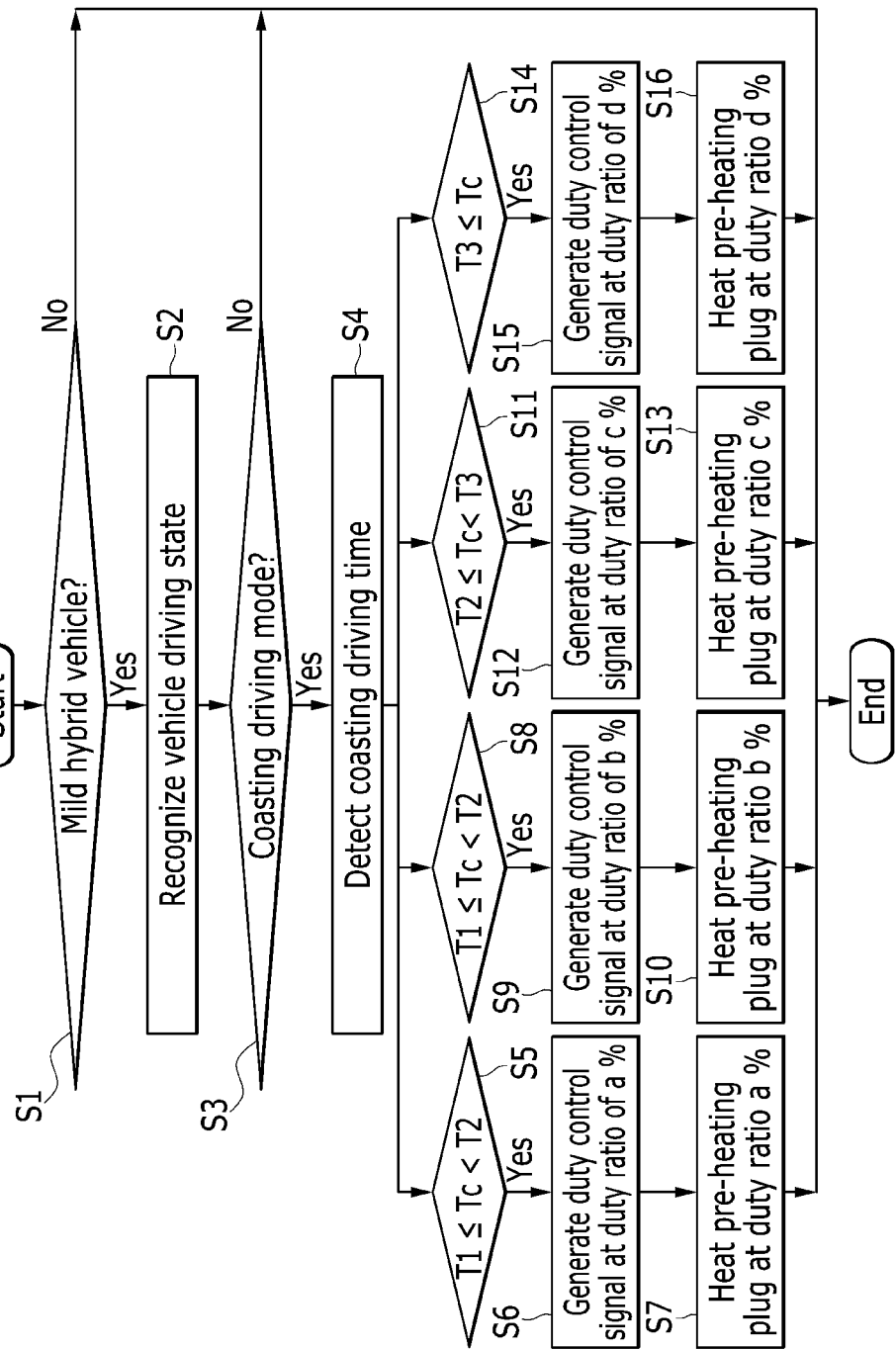
FIG. 5 is a flowchart illustrating a method for pre-heating an engine of a mild hybrid vehicle according to embodiments of the present disclosure.

FIG. 5 is a flowchart illustrating a method for pre-heating an engine of a mild hybrid vehicle according to embodiments of the present disclosure.

As shown in FIG. 5, first, the pre-heating controller 100 receives the battery information by requesting it from the converter controller 7, and receives the motor information by requesting it from the motor-generator 11. The pre-heating controller 100 determines the mild hybrid vehicle or not according to the battery information and the motor information (step S1).

According to the determination result, in the case of the mild hybrid vehicle, the pre-heating controller 100 recognizes a driving state of the vehicle (step S2). For example, the pre-heating controller 100 may recognize a fuel supply state of the engine 15, a start on/off state of the engine 15, RPM of the engine 15, a vehicle velocity, and the like.

Next, the pre-heating controller 100 determines whether the vehicle enters the coasting driving mode (step S3). When the acceleration and deceleration pedals are not operated, the clutch 13 is in the dissociated state, and the start of the engine 15 is off, the pre-heating controller 100 may determine that the vehicle is switched to the coasting driving mode.

According to the determination result, when the vehicle enters the coasting driving mode, the pre-heating controller 100 detects a coasting driving time Tc (step S4). For example, the pre-heating controller 100 may detect a time when the clutch 13 is dissociated and the start of the engine 15 is off as a coasting driving start time, and detect a time when the clutch 13 is associated and the start of the engine 15 is on as a coasting driving completion time. In addition, the pre-heating controller 100 may calculate a period from the coasting driving start time to the coasting driving completion time as the coasting driving time Tc.

Next, when the coasting driving time Tc is less than a first set time T1 (step S5), the pre-heating controller 100 extracts pre-heating time information corresponding to the duty ratio of a % from the look-up table (LUT) to generate the duty control signal (CPWM) (step S6).

Then, the driver 200 generates the pulse width modulation signal (SPWM) at the duty ratio of a % and the electrical energy of the low-voltage battery 5 is supplied to the pre-heating plug 300 according to the pulse width modulation signal (SPWM) to pre-heat the engine 15 (step S7).

Further, when the coasting driving time Tc is equal to or more than the first set time T1 and less than a second set time T2 (step S8), the pre-heating controller 100 extracts pre-heating time information corresponding to the duty ratio of b % from the look-up table (LUT) to generate the duty control signal (CPWM) (step S9).

Then, the driver 200 generates the pulse width modulation signal (SPWM) at the duty ratio of b % and the electrical energy of the low-voltage battery 5 is supplied to the pre-heating plug 300 according to the pulse width modulation signal (SPWM) to pre-heat the engine 15 (step S10).

In addition, when the coasting driving time Tc is equal to or more than the second set time T2 and less than a third set time T3 (step S11), the pre-heating controller 100 extracts pre-heating time information corresponding to the duty ratio of c % from the look-up table (LUT) to generate the duty control signal (CPWM) (step S12).

Then, the driver 200 generates the pulse width modulation signal (SPWM) at the duty ratio of c % and the electrical energy of the low-voltage battery 5 is supplied to the pre-heating plug 300 according to the pulse width modulation signal (SPWM) to pre-heat the engine 15 (step S13).

In addition, when the coasting driving time Tc is equal to or more than the third set time T3 (step S14), the pre-heating controller 100 extracts pre-heating time information corresponding to the duty ratio of d % from the look-up table (LUT) to generate the duty control signal (CPWM) (step S15).

Then, the driver 200 generates the pulse width modulation signal (SPWM) at the duty ratio of d % and the electrical energy of the low-voltage battery 5 is supplied to the pre-heating plug 300 according to the pulse width modulation signal (SPWM) to pre-heat the engine 15 (step S16). That is, the pre-heating controller 100 controls a pre-heating time of the pre-heating plug differently according to the coasting driving time Tc within the duty ratio interval when the pre-heating plug 300 may be heated. For example, the pre-heating controller 100 controls the pre-heating time to be longer in the order of the duty ratios of a, b, c, and d % as the coasting driving time Tc increases. On the contrary, the pre-heating controller 100 controls the pre-heating time to be shorter as the coasting driving time Tc decreases. As a result, the combustion chamber of the engine 15 is not overheated and the electrical energy consumed through the pre-heating plug 300 may be prevented from being wasted.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100: Pre-heating controller
200: Driver
300: Pre-heating plug

What is claimed is:

1. An apparatus for pre-heating an engine of a hybrid vehicle, the apparatus comprising:
    a pre-heating plug pre-heating the engine;
    a pre-heating controller recognizing the hybrid vehicle based on vehicle driving information, determining whether the hybrid vehicle enters a coasting driving mode based on the vehicle driving information, and generating a duty control signal having a pre-heating time set differently depending on a coasting driving time when the hybrid vehicle is driven in the coasting driving mode; and
    a driver supplying electrical energy of a low-voltage battery to the pre-heating plug according to the generated duty control signal,
    wherein the pre-heating controller controls the pre-heating time to be longer as the coasting driving time increases, and controls the pre-heating time to be shorter as the coasting driving time decreases.

2. The apparatus of claim 1, wherein the vehicle driving information includes battery information representing whether the high-voltage battery is mounted, motor information representing a specification of the motor-generator, actuation information of acceleration and deceleration pedals of the hybrid vehicle, association and dissociation state information of the clutch, and starting state information of the engine.

3. The apparatus of claim 2, wherein:
    the hybrid vehicle includes a DC/DC converter controlled by a converter controller, converting electrical energy of the high-voltage battery, and supplying the converted electrical energy to the low-voltage battery, and
    the pre-heating controller receives the battery information from the converter controller through a network, receives the motor information from the motor-generator through the network, and recognizes the hybrid vehicle based on the battery information and the motor information.

4. The apparatus of claim 2, wherein the pre-heating controller determines that the hybrid vehicle enters the coasting driving mode when the acceleration and deceleration pedals are not operated, the clutch is in a dissociated state, and the engine is off.

5. The apparatus of claim 1, wherein the pre-heating controller controls a look-up table storing pre-heating time information for each coasting driving time.

6. The apparatus of claim 5, wherein the pre-heating controller extracts the pre-heating time information corresponding to the coasting driving time from the look-up table and generates the pre-heating time information as the duty control signal.

7. The apparatus of claim 5, wherein the driver includes a pulse control unit generating a pulse width modulation signal according to the duty control signal and a switching unit turned on/off according to the pulse width modulation signal to transfer the electrical energy of the low-voltage battery to the pre-heating plug.

8. The apparatus of claim 7, wherein the pulse control unit generates the pulse width modulation signal at a duty ratio corresponding to the pre-heating time information.

9. A method for pre-heating an engine of a hybrid vehicle, the method comprising:
   collecting vehicle driving information;
   recognizing the hybrid vehicle based on the vehicle driving information;
   determining whether the hybrid vehicle enters a coasting driving mode based on the vehicle driving information;
   detecting a coasting driving time when the hybrid vehicle enters the coasting driving mode;
   generating a duty control signal for controlling a pre-heating time set differently depending on the coasting driving time; and
   supplying electrical energy of the low-voltage battery to a pre-heating plug according to the generated duty control signal,
   wherein the pre-heating controller controls the pre-heating time to be longer as the coasting driving time increases, and controls the pre-heating time to be shorter as the coasting driving time decreases.

10. The method of claim 9, wherein the vehicle driving information includes battery information representing whether the high-voltage battery is mounted, motor information representing a specification of the motor-generator, actuation information of acceleration and deceleration pedals of the hybrid vehicle, association and dissociation state information of the clutch, and starting state information of the engine.

11. The method of claim 10, wherein the determining of whether the hybrid vehicle enters the coasting driving mode comprises:
    determining that the hybrid vehicle enters the coasting driving mode when the acceleration and deceleration pedals are not operated, the clutch is in a dissociated state, and the engine is off.

12. The method of claim 10, wherein the detecting of the coasting driving time comprises:
    detecting a start time of the coasting driving mode when the clutch is dissociated and the engine is turned off, and
    detecting an end time of the coasting driving mode when the clutch is associated and the engine is turned on.

13. The method of claim 11, wherein the supplying of the electrical energy of the low-voltage battery to the pre-heating plug comprises:
    generating a pulse width modulation signal at a duty ratio corresponding to the pre-heating time according to the duty control signal, and
    transferring the electrical energy of the low-voltage battery to the pre-heating plug through a switching element which is turned on/off according to the pulse width modulation signal.

* * * * *